United States Patent
Su et al.

(10) Patent No.: US 11,502,341 B2
(45) Date of Patent: Nov. 15, 2022

(54) BATTERY FAST-CHARGING AND COOLING SYSTEM AND METHOD OF OPERATING SAME

(71) Applicant: Nanotek Instruments, Inc., Dayton, OH (US)

(72) Inventors: Yu-Sheng Su, Dayton, OH (US); Hao-Hsun Chang, Centerville, OH (US); Yu-Ming Chen, Dayton, OH (US); Bor Z. Jang, Centerville, OH (US)

(73) Assignee: Global Graphene Group, Inc., Dayton, OH (US)

(*) Notice: Subject to any disclaimer, the term of this patent is extended or adjusted under 35 U.S.C. 154(b) by 344 days.

(21) Appl. No.: 16/521,045

(22) Filed: Jul. 24, 2019

(65) Prior Publication Data

US 2021/0028507 A1   Jan. 28, 2021

(51) Int. Cl.
| | | |
|---|---|---|
| *H01M 10/44* | (2006.01) | |
| *H01M 10/613* | (2014.01) | |
| *H01M 10/48* | (2006.01) | |
| *H01M 10/615* | (2014.01) | |
| *H01M 10/0525* | (2010.01) | |

(52) U.S. Cl.
CPC ......... *H01M 10/44* (2013.01); *H01M 10/486* (2013.01); *H01M 10/613* (2015.04); *H01M 10/615* (2015.04); *H01M 10/0525* (2013.01); *H01M 2200/10* (2013.01)

(58) Field of Classification Search
None
See application file for complete search history.

(56) References Cited

U.S. PATENT DOCUMENTS

| | | | |
|---|---|---|---|
| 7,071,258 B1 | 7/2006 | Jang et al. | |
| 11,075,426 B2 * | 7/2021 | Lee | H01M 10/6565 |
| 2006/0181247 A1 * | 8/2006 | Marukawa | H01M 10/6566 |
| | | | 320/150 |
| 2007/0238015 A1 * | 10/2007 | Kubota | H01M 10/625 |
| | | | 429/120 |
| 2008/0233475 A1 * | 9/2008 | Kozu | H01M 10/613 |
| | | | 429/159 |
| 2009/0317698 A1 * | 12/2009 | Murata | H01M 8/2475 |
| | | | 429/62 |

(Continued)

OTHER PUBLICATIONS

Jang et al., "Processing of Nano Graphene Platelets (NGPs) and NGP Nanocomposites: A Review" J Materials Sci. (2008) vol. 43, pp. 5092-5101.

*Primary Examiner* — Arun C Williams

(57) ABSTRACT

Provided is a battery charging system comprising (a) at least one charging circuit to charge at least one rechargeable battery cell; (b) a heat source to provide heat that is transported through a heat spreader element, implemented fully or partially inside said at least one battery cell, to heat up the battery cell to a desired temperature Tc before or during battery charging; and (c) cooling means in thermal contact with the heat spreader element configured to enable transporting internal heat of the battery cell through the heat spreader element to the cooling means when the battery cell is discharged. Charging the battery at Tc enables completion of the battery in less than 15 minutes, typically less than 10 minutes, and more typically less than 5 minutes without adversely impacting the battery structure and performance.

27 Claims, 7 Drawing Sheets

(56) References Cited

U.S. PATENT DOCUMENTS

| | | | |
|---|---|---|---|
| 2012/0214034 A1* | 8/2012 | Minokawa | H01M 10/613 |
| | | | 429/83 |
| 2014/0285135 A1 | 9/2014 | Ji et al. | |
| 2014/0295222 A1 | 10/2014 | Wang et al. | |
| 2014/0342194 A1 | 11/2014 | Wang et al. | |
| 2015/0010785 A1* | 1/2015 | Ogawa | H01M 8/04164 |
| | | | 429/9 |
| 2015/0104681 A1 | 4/2015 | Wang et al. | |
| 2015/0303444 A1 | 10/2015 | Wang et al. | |
| 2016/0268646 A1 | 9/2016 | Wang et al. | |

* cited by examiner

BATTERY FAST-CHARGING AND COOLING SYSTEM AND METHOD OF OPERATING SAME

FIELD

The present disclosure relates generally to the field of batteries and, in particular, to batteries that are fast rechargeable and related battery charging systems.

BACKGROUND

Electric vehicles (EVs) are viewed as a promising solution to $CO_2$ emission and climate change issues. Batteries have been at the heart of the rapidly emerging EV industry. Despite the dramatic drop in cost of lithium-ion batteries (LiBs) over the past decade (from higher than US$1,000/kWh to less than US$200/kWh), the EV market still accounts for only ~1% of annual light-duty vehicle sales. Range anxiety, the fear that an EV may run out of battery power during a trip, has long been regarded as a key reason for consumers' reluctance to adopt EVs. This issue of range anxiety is exacerbated by the notion that recharging batteries in an EV usually take much longer time to recharge than refueling internal combustion engine vehicles (ICEVs).

To be competitive with ICEVs, fast charging of EVs should be weather-independent and should be comparable in the required length of time as refueling a gasoline car. Variations in temperatures in different geographic regions and different seasons of a given region have posed a challenge to fulfill the need to have fast charging of EV batteries since EV batteries (e.g. lithium-ion batteries) can behave vastly different at different charging temperatures. In winter, half of the United States and most of Northern Europe has an average temperature below 0° C. None of today's EV batteries allow for fast charging at low temperatures. For instance, according to the owner's manual, Nissan Leaf can be charged to 80% full in 30 min (~2C charge rate) at room temperature, but would take >90 min (<C/1.5 charge rate) to charge the same amount of energy at low temperatures. Such a long recharge time is considered as necessary to avoid lithium plating on anode material surfaces. Currently, LiBs typically use graphite as anode material, which has a lithium intercalation potential within 100 mV vs. Li/Li+. Under some extreme conditions, the large anode polarization can bring graphite potential below the threshold for lithium plating.

The deposited lithium on anode material surfaces reacts quickly with the electrolyte, resulting in irreversible capacity loss. Additionally, the metallic lithium can grow into dendrites, which can penetrate through the separator, reaching the cathode to induce internal shorting. To prevent lithium plating, lithium-ion batteries are charged at very low rate (C/10 or less) at low temperatures, which require an excessively long period of time to be fully charged.

One approach to solving this issue entails introducing electrical current into the battery cell for resistance heating of the battery cell. As one example, this can be accomplished by heating up the battery cell through controlled pulse charging and discharging of the battery. As another example, a sheet of metal foil is implemented inside a battery cell to generate joule heat that raises the battery temperature to a desired temperature for battery charging, as disclosed by Chao Y. Wang, et al (e.g. US Publication No. 20140285135; 20140295222; 20140342194; 20150104681; 20150303444; and 20160268646).

However, such an approach of internal joule heating or resistance heating has several major drawbacks. One major problem is the danger of overheating when the electric current is switched on, allowing a large amount of current to reach a location in an extremely short period of time, creating local hot spots that can significantly degrade or damage the various component materials (anode, cathode, separator, and electrolyte, etc.) of a cell. Under extreme conditions, the local heat may cause the liquid electrolyte to catch fire, leading to fire and explosion hazards. Another major issue is the requirement of implementing a complex electric circuit that controls both heating and battery charging; this battery management system must allow for constant temperature sensing and frequent switching between resistance-heating (e.g. through a metal foil) and electric charging of a battery cell.

Accordingly, a continuing need exists to reduce the charging time of a rechargeable battery without negatively impacting the battery. An urgent need exists for a battery that can be fast charged at all climate conditions and an effective method and system for fast charging a battery.

In addition to the long recharge time, overheating or thermal runaway of battery, leading to a battery catching fire or battery explosion, has been another serious barrier against the acceptance of battery-driven EVs. There has been no effective approach to overcoming this battery safety problem. An urgent need exists for a battery system that can be operated in a safe mode free from any thermal runaway problem.

An object of the present disclosure is to provide a fast-chargeable battery that can also operate in a safe mode with reduced or eliminated chance of overheating, a method of operating same, and a system and apparatus for achieving both functions of fast chargeability and cooling.

SUMMARY

It may be noted that the word "electrode" herein refers to either an anode (negative electrode) or a cathode (positive electrode) of a battery. These definitions are also commonly accepted in the art of batteries or electrochemistry. In battery industry, a module comprises a plurality of battery cells packaged together. A pack comprises a plurality of modules aggregated together. The presently invented battery charging system can be used to heat and charge one or a plurality of battery cells, regardless if or not they are packed into a module or pack or simply some individual battery cells. The term "battery" can refer to a battery cell or several battery cells connected together.

In some embodiments, this disclosure provides a battery charging system to enable fast charging of a battery (including one or multiple battery cells). The battery charging system comprises at least one charging circuit to charge at least one rechargeable battery cell and a heat source to provide heat that is transported through a heat spreader element (implemented fully or partially inside the at least one battery cell) to heat up the battery cell or cells to a desired temperature Tc before or during conducting a fast charging operation of the battery cell(s). The battery charging system also comprises cooling means to cool down a battery cell or multiple battery cells in a module or pack when the battery is discharged (e.g. when the cell(s) are operated to power an electronic device or EV motor). The heat generated inside a cell is captured by the internally disposed heat spreader element, which transports the capture heat to the cooling means. The battery charging system can operate alternately between a heating mode (when or before the battery cells are recharged) and a cooling mode (when the cells are discharged).

In some preferred embodiments, the battery charging system comprises multiple charging stations to heat (and cool) and charge multiple rechargeable battery cells, wherein each charging station comprises one charging circuit, one heat source, and cooling means.

The rechargeable battery cell preferably comprises an anode, a cathode, an electrolyte disposed between the anode and the cathode, a protective housing that at least partially encloses the anode, the cathode and the electrolyte, at least one heat-spreader element disposed partially or entirely inside the protective housing and configured to receive heat from an external heat source at a desired heating temperature $T_h$ to heat up the battery to a desired temperature Tc for battery charging. In some embodiments, the heat-spreader element does not receive an electrical current from an external circuit (e.g. battery charger) to generate heat for resistance heating. Tc is typically chosen to be from 30° C. to 90° C., more typically from 40° to 80° C., and most typically from 45° to 70° C.

A heat source may be heated by using laser heating, resistance heating, dielectric heating, thermal-electric heating, microwave heating, radio frequency heating, hot fluid heating (e.g. hot water, steam, silicone oil, etc. in a tubing), or a combination thereof.

The cooling means is preferably selected from a heat sink, a heat pipe, a vapor chamber, a stream of flowing fluid (when an EV is in motion, air may be directed to flow into contact with the heat spreader tabs, for instance), a thermoelectric device, a heat exchanger, a radiator, or a combination thereof.

Preferably, the heat-spreader element does not receive an electrical current from the charging circuit to generate heat inside the battery cell for internal resistance heating of the battery cell (not producing Joule heat in situ inside the cell).

In some embodiments, the rechargeable battery cell further comprises at least a temperature sensor for measuring an internal temperature of the battery. In some embodiments, the heat-spreader element acts as a temperature sensor for measuring an internal temperature of the battery. For instance, the graphene sheet exhibits a resistance that varies with the surrounding temperature and, as such, a simple resistance measurement may be used to indicate the local temperature where the graphene sheet is disposed.

In certain embodiments, the heat-spreader element comprises a high thermal conductivity material having a thermal conductivity no less than 10 W/mK. Preferably, the heat-spreader element comprises a material selected from graphene film (e.g. composed of graphene sheets aggregated together or bonded together into a film or sheet form), flexible graphite sheet, artificial graphite film (e.g. the films produced by carbonizing and graphitizing a polymer film, such as polyimide), foil or sheet of Ag, Ag, Cu, Al, brass, steel, Ti, Ni, Mg alloy, silicon nitride, boron nitride, aluminum nitride, boron arsenide, a composite thereof, or a combination thereof.

The graphene film contains a graphene selected from pristine graphene, graphene oxide, reduced graphene oxide, graphene fluoride, graphene chloride, graphene bromide, graphene iodide, hydrogenated graphene, nitrogenated graphene, chemically functionalized graphene, or a combination thereof.

In certain embodiments, the heat-spreader element has a heat-spreading area at least as large as 50% of a surface area of the anode or cathode. The heat-spreader element is preferably flat and has a large heat-spreading area having a length-to-thickness ratio greater than 10, preferably greater than 50, more preferably greater than 100, and further more preferably greater than 500. The heat-spreader element typically has a thickness from about 0.5 μm to about 1 mm.

In the battery charging system, the heat source preferably has a clipping means to reversibly grip or firmly connect with a tab of the heat spreader element.

Preferably, the heat-spreader element is in a heat-spreading relation to the anode or the cathode and provides heat thereto before or during charging of the battery. For instance, the heat-spreader element is disposed near or in physical contact with the anode or the cathode. There can be two or more heat spreader elements, one on the anode side and the other on the cathode side In certain embodiments, the heat-spreader element has a tab protruded outside of the protective housing, wherein the tab is configured to controllably make thermal contact with the external heat source (before or during battery charging) and get disconnected with the external heat source when a battery temperature reaches the desired temperature Tc, for instance.

In certain embodiments, the battery cell has an anode terminal and a cathode terminal for operating the battery and the heat-spreader element is in thermal contact with the anode terminal or the cathode terminal wherein the anode terminal or the cathode terminal is configured to receive heat from the outside heat source. In some configurations, the heat-spreader element is in thermal contact with the protective housing or a cap of the protective housing.

The rechargeable battery may be a lithium-ion battery, lithium metal secondary battery, lithium-sulfur battery, lithium-air battery, lithium-selenium battery, sodium-ion battery, sodium metal secondary battery, sodium-sulfur battery, sodium-air battery, magnesium-ion battery, magnesium metal battery, aluminum-ion battery, aluminum metal secondary battery, zinc-ion battery, zinc metal battery, zinc-air battery, nickel metal hydride battery, lead acid battery, lead acid-carbon battery, lead acid-based ultra-battery, lithium-ion capacitor, or supercapacitor.

The present disclosure also provides a method of operating a battery charging system comprising multiple charging stations, the method comprising: (a) positioning multiple rechargeable battery cells in the respective multiple charging stations; (b) operating at least a heat source of the battery charging system to provide heat that is transported through a heat spreader element (implemented fully or partially inside each of said battery cells) to heat up the battery cells to a desired temperature Tc; and (c) activating at least one charging circuit from the battery charging system to charge the battery cells at or near Tc until the battery cells reach a desired degree of charge (DOC).

In certain embodiments, preferably each of the battery cells comprises therein a heat spreader element having an end connected to an electrode terminal of the battery cell or having a tab protruded out of a protective housing of the battery cell and wherein step (b) comprises bringing the electrode terminal or the tab in thermal contact with an external heat source, allowing heat from the heat source to transfer into the battery cell for heating the battery to a desired temperature Tc.

In certain embodiments, the method further comprises a step of operating a temperature sensor for measuring an internal temperature of the battery. The step of operating a temperature sensor may comprise operating the heat-spreader element as a temperature sensor for measuring an internal temperature of the battery.

In the invented method, the heat-spreader element preferably comprises a high thermal conductivity material having a thermal conductivity no less than 10 W/mK and wherein a time for heating the battery to temperature Tc is no greater than 5 minutes.

In some preferred embodiments, the heat-spreader element comprises a material selected from graphene film, flexible graphite sheet, artificial graphite film, Ag, Ag, Cu, Al, brass, steel, Ti, Ni, Mg alloy sheet, silicon nitride, boron nitride, aluminum nitride, boron arsenide, a composite thereof, or a combination thereof. The graphene film preferably contains a graphene selected from pristine graphene, graphene oxide, reduced graphene oxide, graphene fluoride, graphene chloride, graphene bromide, graphene iodide, hydrogenated graphene, nitrogenated graphene, chemically functionalized graphene, or a combination thereof.

In some embodiments, the step of implementing a heat spreader element inside the battery cell comprises placing the heat-spreader element in physical or thermal contact with the anode or the cathode for providing heat thereto (e.g. for transporting heat through the anode or cathode electrode to heat up the battery prior to battery charging).

In some embodiments, the heat-spreader element has a tab protruded outside of the protective housing of a cell and step (b) comprises controllably making the tab to be in thermal contact with the external heat source and disconnecting the tab from the external heat source when a battery temperature reaches the desired temperature Tc.

In certain embodiments, the heat-spreader element has a tab protruded outside of the protective housing and wherein (d) comprises controllably making the tab in thermal contact with the cooling means when the battery cell is discharged.

In some embodiments, the battery cell has an anode terminal and a cathode terminal for operating the battery cell and the heat-spreader element is in thermal contact with the anode terminal or the cathode terminal and wherein step (b) comprises bringing the anode terminal or the cathode terminal in physical or thermal contact with the external heat source for battery charging; or wherein step (d) comprises bringing the anode terminal or the cathode terminal in physical or thermal contact with the cooling means when the battery cell is discharged.

In some embodiments, the heat-spreader element is in thermal contact with the protective housing or a cap of the protective housing and step (b) comprises bringing the external heat source to thermally or physically contact the protective housing or the cap, supplying heat thereto for cell charging; or said (d) comprises bringing the cooling means to thermally or physically contact the protective housing or the cap, removing heat therefrom for battery discharging.

DETAILED DESCRIPTION OF PREFERRED EMBODIMENTS

Figure 1A:
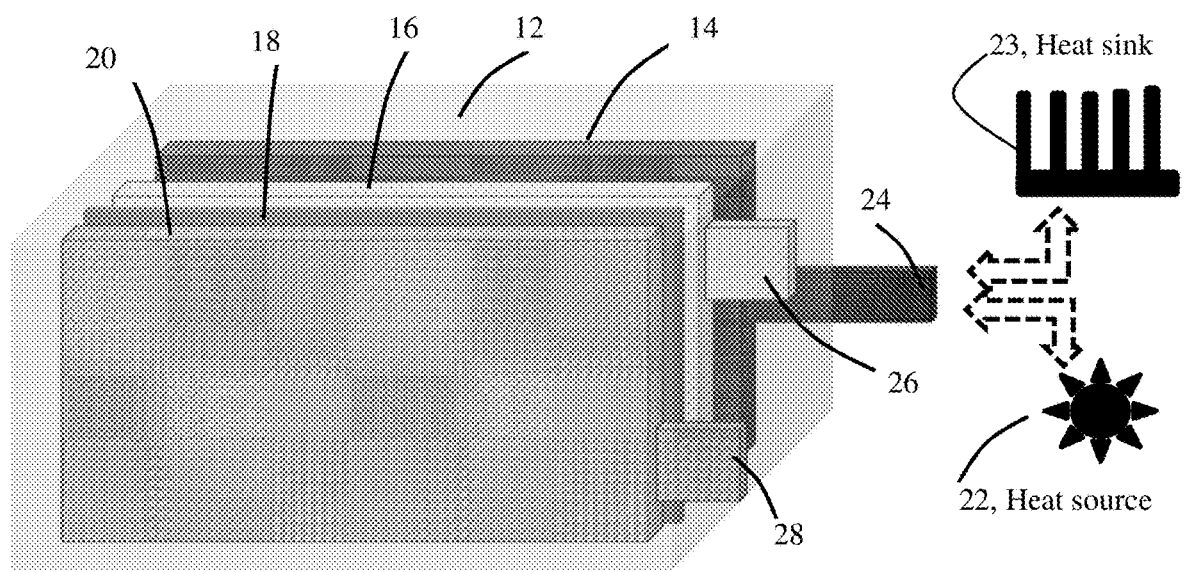
FIG. 1(A) Schematic of a battery according to an embodiment of the present disclosure; the heat spreader tab may be connected to a heat source or, alternately, a heat sink.

The present discussion of preferred embodiments makes use of lithium-ion battery as an example. The present disclosure is applicable to a wide array of rechargeable batteries, not limited to the lithium-ion batteries. Examples of the rechargeable batteries include the lithium-ion battery, lithium metal secondary battery, lithium-sulfur battery, lithium-air battery, lithium-selenium battery, sodium-ion battery, sodium metal secondary battery, sodium-sulfur battery, sodium-air battery, magnesium-ion battery, magnesium metal battery, aluminum-ion battery, aluminum metal secondary battery, zinc-ion battery, zinc metal battery, zinc-air battery, nickel metal hydride battery, lead acid battery, lead acid-carbon battery, lead acid-based ultra-battery, lithium-ion capacitor, or supercapacitor As indicated in the Background section of instant specification, lithium plating on the anode material is a major obstacle to fast chargeability of a lithium-ion battery. A major symptom of lithium plating is a drastic capacity loss. Lithium plating can also pose safety hazards. Recent data available in battery industry has demonstrated that cycle life of LiBs drops considerably with temperature. Typically, an exponential drop of cycle life with decreasing temperature is observed, following the Arrhenius law. For instance, even at a cool temperature of 10° C., cell life is only about half of that at 25° C. Thus, even at fast charging stations, consumers are not able to quickly recharge their EVs at low ambient temperatures. Compared to traditional gasoline-powered vehicles whose fuel tank can be filled up in less than five minutes under all climate conditions, EV requires hours to get a full recharge in cold weather. Fast charging is essential to enabling public charge stations and battery-powered electric vehicles.

To avoid the danger of damaging the battery due to battery charging at low ambient temperatures and to reduce the charging time, we propose to heat the rechargeable batteries to a near room-temperature range or higher suitable for fast charging. However, conventional battery heating systems heat the battery externally by using convective air/liquid heating or thermal jackets, where heat slowly gets transported from the exterior into the battery. Such processes suffer from long heating time and significant heat loss to the surroundings. Another conventional approach entails introducing electric current into the battery for internal resistance heating of the battery. Such an approach runs the danger of overheating the battery in that, when a large amount of current reaches an internal battery location in an extremely short period of time, the resulting local hot spots can significantly degrade or damage the various component materials. Instant disclosure provides an effective solution to this problem.

In some embodiments, this disclosure provides a battery charging system to enable fast charging of a battery. The battery charging system comprises at least one charging circuit to charge at least one rechargeable battery cell and a heat source to provide heat that is transported through a heat spreader element (implemented fully or partially inside said at least one battery cell) to heat up said battery cell to a desired temperature Tc before or during conducting a fast charging operation of the battery cell. The battery charging system also has a provision to cool the battery cells when the battery is discharged (e.g. when the battery is operated to power a load or external device).

Thus, the present disclosure also provides a battery charging system comprising (a) at least one charging circuit to charge at least one rechargeable battery cell; (b) at least a heat source to provide heat that is transported through a heat spreader element (implemented fully or partially inside said at least one battery cell) to heat up the battery cell to a desired temperature Tc before or during charging of the battery cell; and (c) cooling means in thermal contact with the heat spreader element configured to enable transporting of internal heat of the battery cell through the heat spreader element to the cooling means when the battery cell is discharged, wherein the cooling means is not in thermal contact with the heat spreader element when the battery cell is heated by the heat source.

In some embodiments, the rechargeable battery cell comprises an anode, a cathode, an electrolyte disposed between the anode and the cathode, and a protective housing that at least partially encloses the anode, the cathode and the electrolyte, wherein the heat-spreader element is disposed partially or entirely inside the protective housing and configured to alternate between receiving heat from the heat source at a desired heating temperature $T_h$ to heat up the battery cell to the desired temperature Tc for battery cell charging and transferring heat from the battery cell to the cooling means when the battery cell is discharged or is operated to provide electric power to an external device or load. Preferably, the heat-spreader element does not receive an electrical current from an external circuit (e.g. battery charger) to generate heat for resistance heating.

As illustrated in FIG. 1(A), according to some embodiments of the disclosure, the battery cell is in thermal or physical contact with either an external heat source (e.g. a heating element or Peltier junction heater, 22) before or during charging of the cell or, alternately, a cooling means (e.g. a heat sink 23, vapor chamber, or cooled plate) during cell discharging. The battery cell comprises an anode (negative electrode) 16, a cathode (positive electrode) 20, a separator 18 and electrolyte (not shown) disposed between the anode and the cathode, a casing or protective housing 12 that substantially encloses the above-listed components. Also enclosed is a heat spreader element 14, wherein the heat spreader element has a tab 24 protruded out of the battery cell housing 12. Also protruded out of the housing are a negative electrode terminal 26 connected to or integral with the anode 16 and a positive electrode terminal 28 connected to or integral with the cathode 20. The two electrode terminals are to be reversibly contacted with a battery charger (during battery charging) or a load (e.g. an electronic device, such as a smart phone, to be powered by the battery while discharging). It is the heat spreader element tab 24 that is in thermal or physical contact with the external heat source that helps to heat up the battery cell to a desired temperature for fast charging.

Figure 1B:
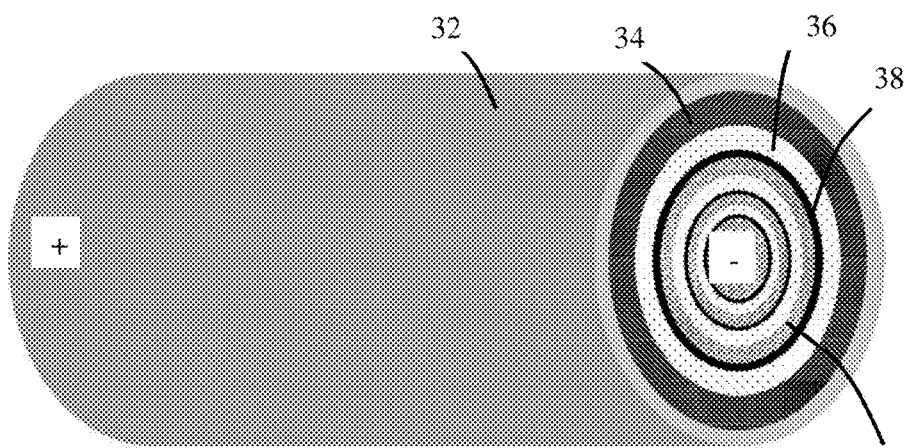
FIG. 1(B) Schematic of a battery according to another embodiment of the present disclosure; the heat spreader tab (possibly connected to a cell cap or an electrode terminal) may be connected to a heat source or, alternately, a heat sink.

As illustrated in FIG. 1(B), according to another embodiment of the disclosure, the battery system comprises a battery cell in thermal or physical contact with an external heat source (before or during battery cell charging) or, alternately, a cooling means (e.g. a heat sink) during battery discharging. The battery comprises an anode 36, a cathode 40, a thin separator 38 and electrolyte (not shown) disposed between the anode and the cathode, a casing or protective housing 32 that substantially encloses the above-listed components. Also enclosed is a heat spreader element 34, which has one end in thermal contact with a housing cap (an example being shown in FIG. 3(C)); this cap, in combination with the housing 32, substantially seals the entire battery cell. This cap is, in turn, in thermal contact with the external heat source or, alternately, cooling means. This cap may also serve as a terminal (e.g. negative terminal) for the battery cell; the positive terminal being located at the opposite end of this cylindrical cell. Alternatively, this cap may serve as a positive terminal and the opposite end is a negative terminal.

Figure 3A:
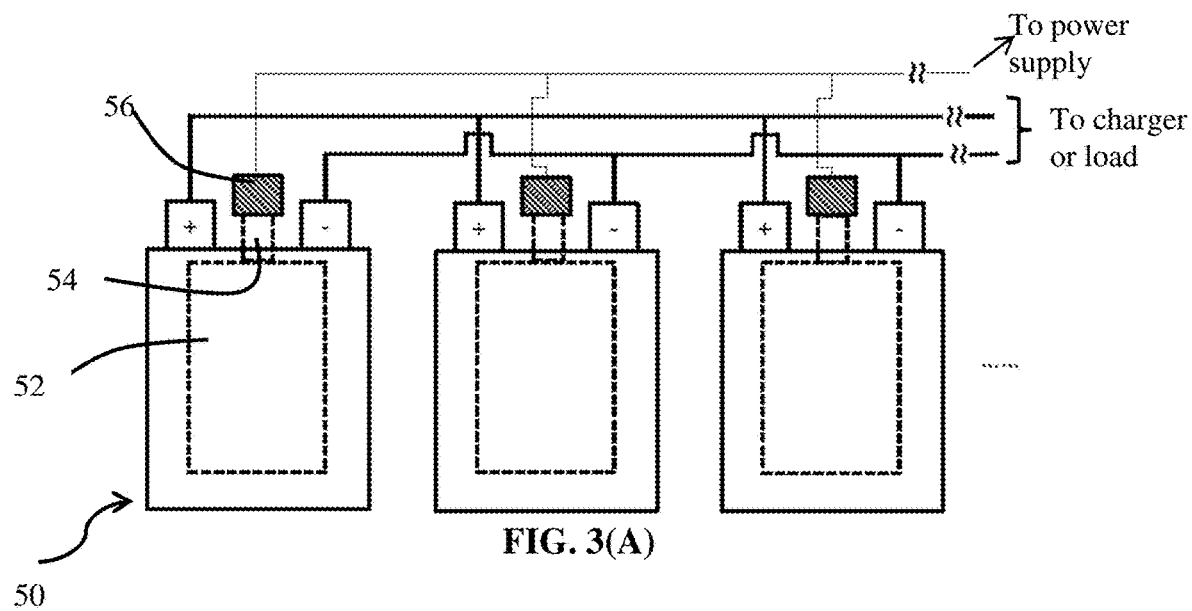
FIG. 3(A) Schematic of a multiple-station battery charging and cooling system according to an embodiment of the present disclosure; each station providing a charging circuit (schematically represented by 2 electric wires), a heat source (e.g. a heating element 56), and a cooling means (not shown)

As illustrated in FIG. 3(A), as an example, a battery charging and cooling system can contain multiple charging stations for charging multiple battery cells (e.g. in a module or a pack). Each charging station comprises a charging circuit to charge a battery cell (e.g. 50) and a heat source (e.g. a heating element 56) to provide heat that is transferred though a heat spreader element 52 implemented inside a battery cell to heat up the cell for fast charging. Each cell has at least a heat spreader element (disposed partially or entirely inside the battery cell) that is in thermal contact with at least an external heat source 56 through a tab 54 of the heat spreader element 52 before or during battery cell charging. The battery charging and cooling system also contains cooling means that can alternately replace the heat source to be in thermal contact with the tab of the heat spreader when the battery is discharged.

Figure 3B:
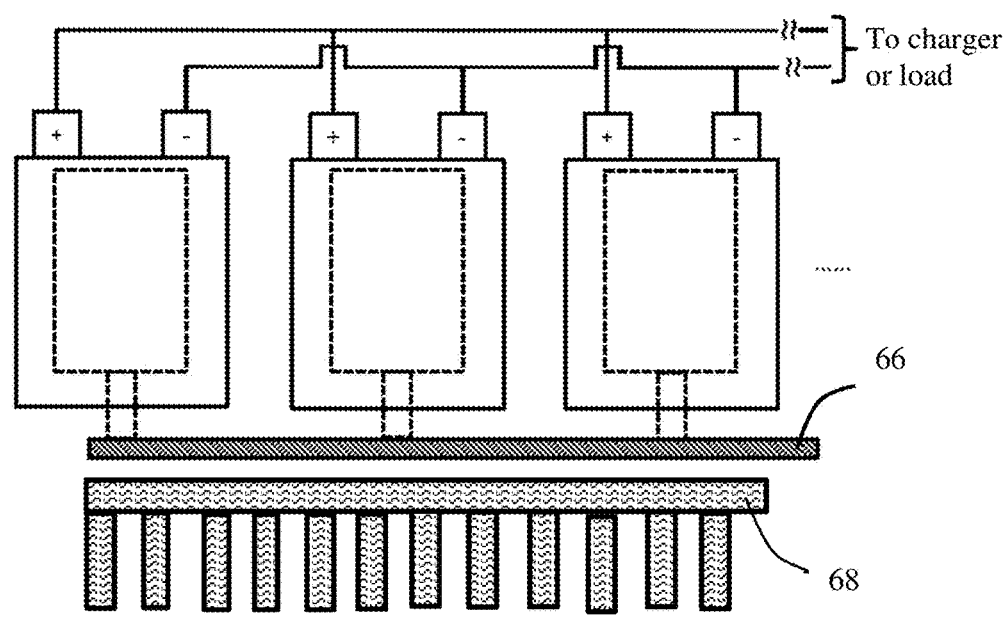
FIG. 3(B) Schematic of a multiple-station battery charging and cooling system according to another embodiment of the present disclosure; each station providing a charging circuit, a heat source (e.g. all 3 stations draw heat from the same heat source, a heated member 66 as an example), and a cooling means (e.g. a heat sink 68)
Figure 3C:
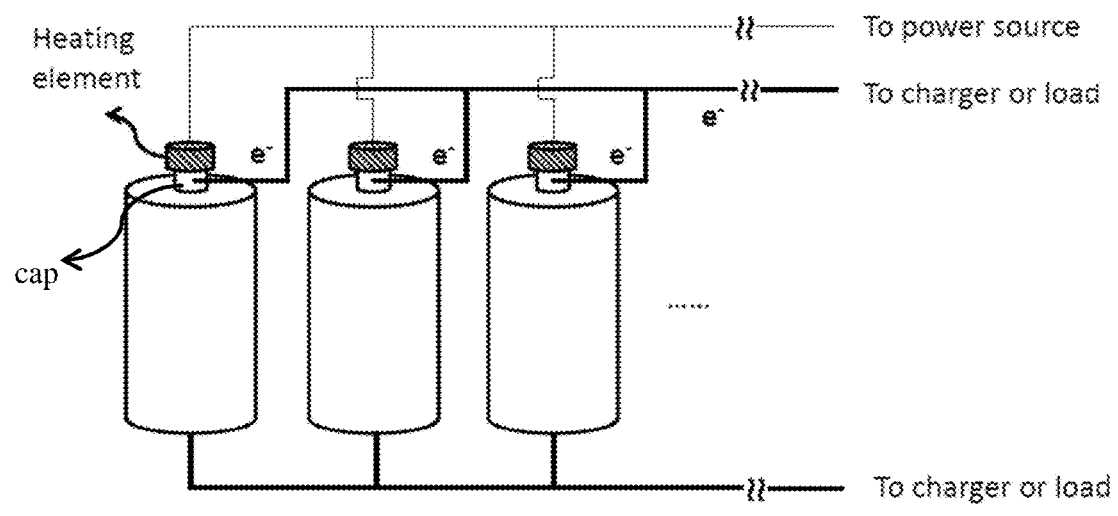
FIG. 3(C) Schematic of a multiple-station battery charging system (for charging cylindrical cells, for instance) according to another embodiment of the present disclosure; each station providing a charging circuit (schematically represented by 2 electric wires), a heat source (e.g. a heating element), and a cooling means (not shown).

As illustrated in FIG. 3(B), one heat source 66 may be in thermal contact with one or a plurality of heat spreader elements (e.g. those heat spreader elements in multiple cells). Although FIG. 3(A), as an example, shows three heat sources that are connected to three battery cells, these three heat sources can be just from the same heating means. For instance, the same heated plate (e.g. 66 in FIG. 3(B)) can be used to heat three or more battery cells by heat conductance through their respective heat spreader elements into the individual cells. When the battery cell is discharged, those heat spreader elements are in thermal contact with cooling means (e.g. heat sink 68). FIG. 3(C) schematically shows a multiple-station battery charging/cooling system (for charging/cooling cylindrical cells, for instance) according to another embodiment of the present disclosure; each station providing a charging circuit (schematically represented by 2 electric wires), a heat source (e.g. a heating element), and a cooling means (not shown).

Figure 5:
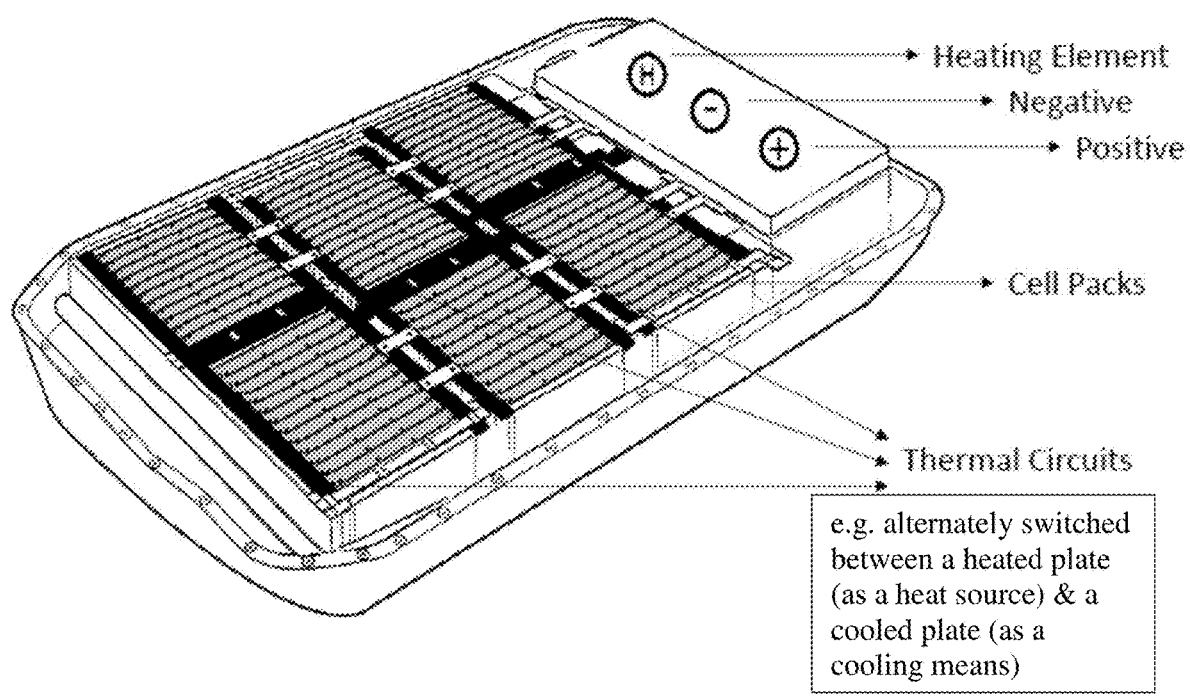
FIG. 5 Schematic of a battery pack charging and cooling system, according to an embodiment of the present disclosure. This battery pack may be disposed in the chassis of an electric vehicle.

Schematically shown in FIG. 5 is a battery pack charging/cooling system, according to an embodiment of the present disclosure. This battery pack may be disposed in the chassis of an electric vehicle. In additional to a battery charging circuit that can recharge all the battery cells in this pack, there are thermal circuits that provide heat to enter the cells through their respective heat spreader elements. These thermal circuits may include electrical circuits that send electric power to heating devices near individual battery cells. These thermal circuits may be simply some heated members that are strategically positioned with respect to individual battery cells to readily transfer heat through the heat spreader tabs or cell caps into the cells. When the battery cells in the pack are discharged to drive the EV, the thermal circuits may become cooling means to keep the battery lower than a safe temperature.

There is no limitation on the type and nature of the external heat source provided that this heat source per se is capable of providing heat to the heat spreader element without sending an electrical current through this element into the battery cell for internal joule heating of the battery cell. For instance, the external heat source may be as simple as a metal plate or a metal clip that is already at a desired heating temperature $T_h$ prior to being brought to contact the element. Such an arrangement of having a ready-to-heat heat source, in conjunction with a heat spreader element of high thermal conductivity, will significantly reduce the time to bring a battery cell to a desired temperature for fast charging.

Alternatively, the external heat source may be rapidly heated to reach $T_h$ as soon as the heat spreader element is brought in contact with the external heat source. This heat source may be heated by using any known heating means; e.g. laser heating, resistance heating, dielectric heating, thermal-electric heating (e.g. Peltier junction heating), microwave heating, radio frequency (RF) heating, etc. Any of these heating means may be used to directly heat the external tab of the heat spreader element provided it does not send a current into the battery. One or a plurality of external heat sources may be used to provide heat to one or a plurality of heat spreader elements of one or a plurality of batteries concurrently or sequentially.

There is also no limitation on the type of cooling means that can be implemented to cool down the battery cells when working to power an electronic device or an EV. The cooling means may be selected from a heat sink, a heat pipe, a vapor chamber, a stream of flowing fluid, a thermoelectric device, a heat exchanger, a radiator, or a combination thereof.

It is important that the heat spreader element has a high thermal conductivity to allow for rapid transfer of a large amount of heat from the external heat source through the heat spreader element to the interior of the battery to be recharged. Such a heat spreader element also enables fast heat transfer from the interior of a battery cell to the cooling means (external to the battery cell) when the cell is discharged. Preferably, for fast charging of the battery cell, such a high thermal conductivity and the cross-sectional area of the heat spreader element are sufficiently high to ensure the battery reaching a desired temperature in less than 15 minutes (preferably less than 10 minutes, further preferably less than 5 minutes, most preferably less than 2 minutes) to enable fast charging. After charging begins, preferably charging is completed in 15 minutes (4 C rate), preferably in 10 minutes (6 C rate), further preferably in 5 minutes (12 C rate), and most preferably in 2 minutes (30 C rate). The battery charging C rate is defined as follows: a nC rate means completion of charging in 60/n minutes or 1/n hour; a 3 C rate means completing the charging in 60/3=20 minutes and a C/3 rate means completing charging in 3 hours.

In certain embodiments, the heat-spreader element comprises a high thermal conductivity material having a thermal conductivity no less than 10 W/mK (preferably no less than 20 W/mK, further preferably greater than 200 W/mK, more preferably greater than 400 W/mK, and most preferably greater than 800 W/mK). Preferably, the heat-spreader element comprises a material selected from graphene film (e.g. composed of graphene sheets aggregated together or bonded together into a film or sheet form), flexible graphite sheet, artificial graphite film (e.g. the films produced by carbonizing and graphitizing a polymer film, such as polyimide), foil or sheet of Ag, Ag, Cu, Al, brass, steel, Ti, Ni, Mg alloy, silicon nitride, boron nitride, aluminum nitride, boron arsenide, a composite thereof, or a combination thereof.

The graphene film contains a graphene selected from pristine graphene, graphene oxide, reduced graphene oxide, graphene fluoride, graphene chloride, graphene bromide, graphene iodide, hydrogenated graphene, nitrogenated graphene, chemically functionalized graphene, or a combination thereof. The graphene film typically exhibits a thermal conductivity from 800 to 1,800 W/mK. Flexible graphite sheet typically exhibits a thermal conductivity from 150 to 600 W/mK. Artificial graphite films (e.g. those produced by carbonizing and graphitizing a polymer film) can exhibit a thermal conductivity from 600 to 1,700 W/mK. Graphene films, flexible graphite sheets, and artificial graphite films are commonly regarded as three distinct classes of materials.

In some embodiments, the rechargeable battery further comprises at least a temperature sensor for measuring an internal temperature of the battery. In some embodiments, the heat-spreader element acts as a temperature sensor for measuring an internal temperature of the battery. For instance, the graphene sheet exhibits a resistance that varies with the surrounding temperature and, as such, a simple resistance measurement may be used to indicate the local temperature where the graphene sheet is disposed.

Carbon materials can assume an essentially amorphous structure (glassy carbon), a highly organized crystal (graphite), or a whole range of intermediate structures that are characterized in that various proportions and sizes of graphite crystallites and defects are dispersed in an amorphous matrix. Typically, a graphite crystallite is composed of a number of graphene sheets or basal planes that are bonded together through van der Waals forces in the c-axis direction, the direction perpendicular to the basal plane. These graphite crystallites are typically micron- or nanometer-sized. The graphite crystallites are dispersed in or connected by crystal defects or an amorphous phase in a graphite particle, which can be a graphite flake, carbon/graphite fiber segment, carbon/graphite whisker, or carbon/graphite nano-fiber. In other words, graphene planes (hexagonal lattice structure of carbon atoms) constitute a significant portion of a graphite particle.

A single-layer graphene sheet is composed of carbon atoms occupying a two-dimensional hexagonal lattice. Multi-layer graphene is a platelet composed of more than one graphene plane. Individual single-layer graphene sheets and multi-layer graphene platelets are herein collectively called nano graphene platelets (NGPs) or graphene materials. NGPs include pristine graphene (essentially 99% of carbon atoms), slightly oxidized graphene (<5% by weight of oxygen), graphene oxide (≥5% by weight of oxygen), slightly fluorinated graphene (<5% by weight of fluorine), graphene fluoride ((≥5% by weight of fluorine), other halogenated graphene, and chemically functionalized graphene.

Our research group was among the first to discover graphene [B. Z. Jang and W. C. Huang, "Nano-scaled Graphene Plates," U.S. patent application Ser. No. 10/274, 473, submitted on Oct. 21, 2002; now U.S. Pat. No. 7,071, 258 (Jul. 4, 2006)]. The processes for producing NGPs and NGP nanocomposites were recently reviewed by us [Bor Z. Jang and A Zhamu, "Processing of Nano Graphene Platelets (NGPs) and NGP Nanocomposites: A Review," J. Materials Sci. 43 (2008) 5092-5101]. The production of various types of graphene sheets is well-known in the art.

Figure 6:
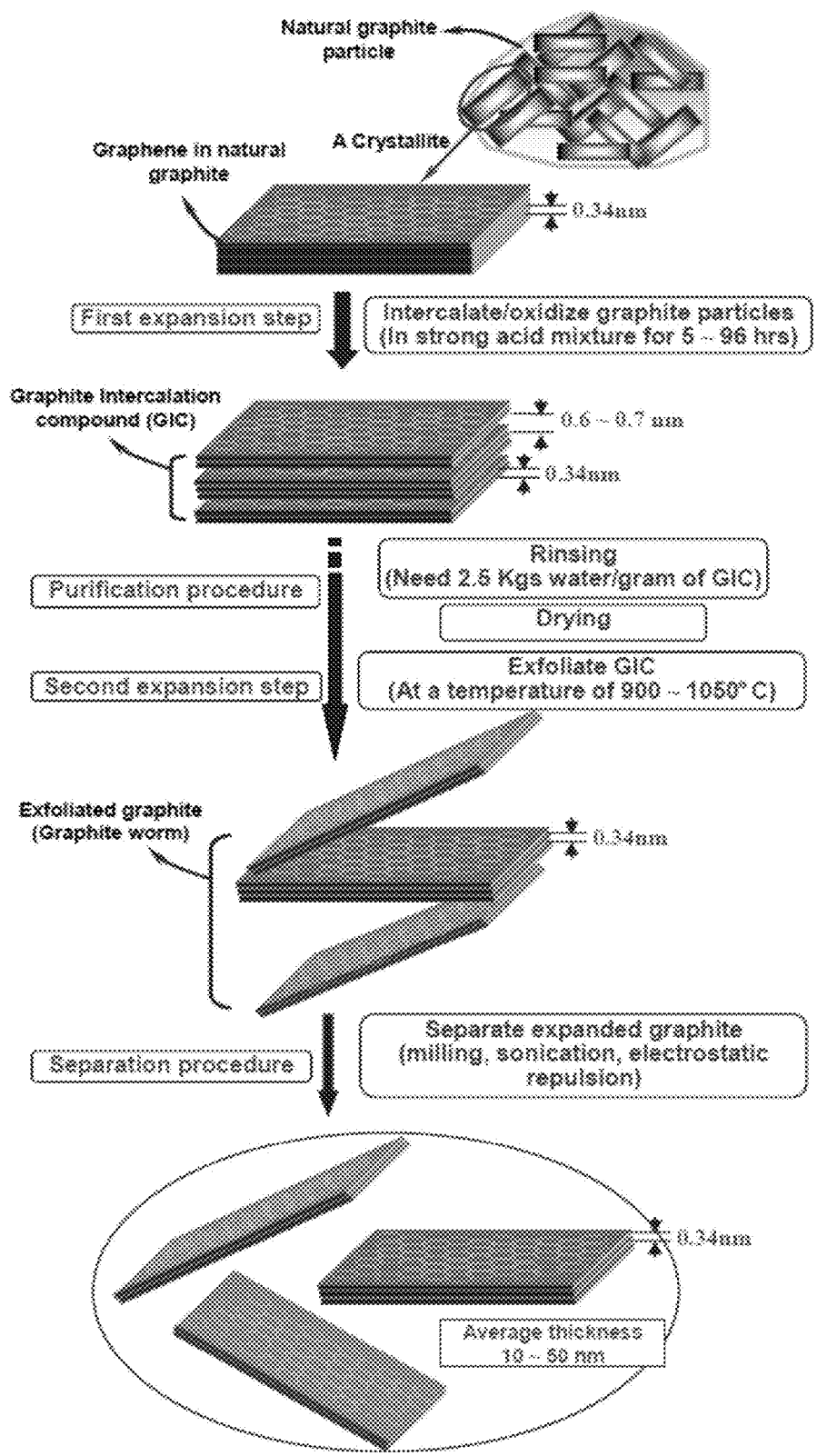
FIG. 6 A diagram showing a procedure for producing graphene oxide sheets. These sheets can then be aggregated (e.g. roll-pressed) together or slurry-coated together, followed by a heat treatment procedure to produce graphene films.

For instance, as shown in FIG. 6, the chemical processes for producing graphene sheets or platelets typically involve immersing powder of graphite or other graphitic material in a mixture of concentrated sulfuric acid, nitric acid, and an oxidizer, such as potassium permanganate or sodium perchlorate, forming a reacting mass that requires typically 5-120 hours to complete the chemical intercalation/oxidation reaction. Once the reaction is completed, the slurry is subjected to repeated steps of rinsing and washing with water. The purified product is commonly referred to as graphite intercalation compound (GIC) or graphite oxide (GO). The suspension containing GIC or GO in water may be subjected to ultrasonication to produce isolated/separated graphene oxide sheets dispersed in water. The resulting products are typically highly oxidized graphene (i.e. graphene oxide with a high oxygen content), which must be chemically or thermal reduced to obtain reduced graphene oxide (RGO).

Alternatively, the GIC suspension may be subjected to drying treatments to remove water. The dried powder is then subjected to a thermal shock treatment. This can be accomplished by placing GIC in a furnace pre-set at a temperature of typically 800-1100° C. (more typically 950-1050° C.) to produce exfoliated graphite (or graphite worms), which may be subjected to a high shear or ultrasonication treatment to produce isolated graphene sheets.

Alternatively, graphite worms may be re-compressed into a film form to obtain a flexible graphite sheet. Flexible graphite sheets are commercially available from many sources worldwide.

The starting graphitic material may be selected from natural graphite, synthetic graphite, highly oriented pyrolytic graphite, graphite fiber, graphitic nano-fiber, graphite fluoride, chemically modified graphite, meso-carbon microbead, partially crystalline graphite, or a combination thereof.

Pristine graphene sheets may be produced by the well-known liquid phase exfoliation or metal-catalyzed chemical vapor deposition (CVD).

The heat-spreader element preferably has a heat-spreading area at least as large as 50% of a surface area of the anode or cathode. The heat-spreader element is preferably flat and has a large heat-spreading area having a length-to-thickness ratio greater than 10, preferably greater than 50, more preferably greater than 100, and further more preferably greater than 500. The heat-spreader element typically has a thickness from about 0.5 µm to about 1 mm.

Preferably, the heat-spreader element is in a heat-spreading relation to the anode or the cathode and provides heat thereto before or during charging of the battery. For instance, the heat-spreader element is disposed near or in physical contact with the anode or the cathode inside the battery. There can be two heat spreader elements, one on the anode side and the other on the cathode side of a cell.

Preferably, as schematically illustrated in FIG. 1(A), the heat-spreader element has a tab protruded outside of the protective housing of a cell, wherein the tab is configured to controllably make thermal contact with the external heat source (before or during battery charging) and get disconnected with the external heat source when a battery cell temperature reaches the desired temperature Tc, for instance. The battery cell has an anode terminal and a cathode terminal that are connected to an anode circuit and cathode circuit, respectively, for operating the battery (e.g. for battery charging and discharging). During discharging of the battery cell (e.g. providing power to a smart phone or an EV), these two terminals are connected to the proper terminals of the battery management system (BMS) of the smart phone or EV. During the charging of the battery, these two terminals may be directly connected to an external battery charger or indirectly through a BMS to an external battery charger. The battery charger and BMS are well-known in the art.

In certain embodiments, the battery cell has an anode terminal and a cathode terminal for operating the battery and the heat-spreader element is in thermal contact with the anode terminal or the cathode terminal wherein the anode terminal or the cathode terminal is configured to receive heat from the outside heat source. In some configurations, as illustrated in FIG. 1(B), the heat-spreader element is in thermal contact with the protective housing or a cap of the protective housing of a cell. This cap or housing may be made to contact with an external heat source to receive heat therefrom. Shown in FIG. 1(B) is but one of many possible configurations, wherein a sheet of heat spreader (e.g. graphene film) is disposed inside a casing (protective housing) to wrap around the anode. One end of the heat spreader element is in contact with the battery cap, which may receive heat from an external heat source (when the cap is in contact with the heat source).

The rechargeable battery may be a lithium-ion battery, lithium metal secondary battery, lithium-sulfur battery, lithium-air battery, lithium-selenium battery, sodium-ion battery, sodium metal secondary battery, sodium-sulfur battery, sodium-air battery, magnesium-ion battery, magnesium metal battery, aluminum-ion battery, aluminum metal secondary battery, zinc-ion battery, zinc metal battery, zinc-air battery, nickel metal hydride battery, lead acid battery, lead acid-carbon battery, lead acid-based ultra-battery, lithium-ion capacitor, or supercapacitor.

There is no limitation on the type of anode materials, electrolytes, cathode materials, etc. that can be used in the presently invented battery.

The anode of a lithium-ion battery (as an example) may contain an anode active material selected from the group consisting of: (A) lithiated and un-lithiated silicon (Si), germanium (Ge), tin (Sn), lead (Pb), antimony (Sb), bismuth (Bi), zinc (Zn), aluminum (Al), titanium (Ti), nickel (Ni), cobalt (Co), phosphorus (P), and cadmium (Cd); (B) lithiated and un-lithiated alloys or intermetallic compounds of Si, Ge, Sn, Pb, Sb, Bi, Zn, Al, Ti, Ni, Co, or Cd with other elements; (C) lithiated and un-lithiated oxides, carbides, nitrides, sulfides, phosphides, selenides, and tellurides of Si, Ge, Sn, Pb, Sb, Bi, Zn, Al, Ti, Fe, Ni, Co, or Cd, and their mixtures, composites, or lithium-containing composites; (D) lithiated and un-lithiated salts and hydroxides of Sn; (E) lithium titanate, lithium manganate, lithium aluminate, lithium-containing titanium oxide, lithium titanium-niobium oxide, lithium transition metal oxide; (F) carbon or graphite particles; and combinations thereof.

The cathode may contain a cathode active material selected from an inorganic material, an organic material, an intrinsically conducting polymer (known to be capable of string lithium ions), a metal oxide/phosphate/sulfide, or a combination thereof. The metal oxide/phosphate/sulfide may be selected from a lithium cobalt oxide, lithium nickel oxide, lithium manganese oxide, lithium vanadium oxide, lithium-mixed metal oxide, lithium iron phosphate, lithium manganese phosphate, lithium vanadium phosphate, lithium mixed metal phosphate, sodium cobalt oxide sodium nickel oxide, sodium manganese oxide, sodium vanadium oxide, sodium-mixed metal oxide, sodium iron phosphate, sodium manganese phosphate, sodium vanadium phosphate, sodium mixed metal phosphate, transition metal sulfide, lithium polysulfide, sodium polysulfide, magnesium polysulfide, or a combination thereof.

In some embodiments, the electrode active material may be a cathode active material selected from sulfur, sulfur compound, sulfur-carbon composite, sulfur-polymer composite, lithium polysulfide, transition metal dichalcogenide, a transition metal trichalcogenide, or a combination thereof. The inorganic material may be selected from $TiS_2$, $TaS_2$, $MoS_2$, $NbSe_3$, $MnO_2$, $CoO_2$, an iron oxide, a vanadium oxide, or a combination thereof. This group of materials is particularly suitable for use as a cathode active material of a lithium metal battery.

The metal oxide/phosphate/sulfide contains a vanadium oxide selected from the group consisting of $VO_2$, $LiVO_2$, $V_2O_5$, $Li_xV_2O_5$, $V_3O_8$, $Li_xV_3O_8$, $Li_xV_3O_7$, $V_4O_9$, $Li_xV_4O_9$, $V_6O_{13}$, $Li_xV_6O_{13}$, their doped versions, their derivatives, and combinations thereof, wherein $0.1 < x < 5$. In some embodiments, the metal oxide/phosphate/sulfide is selected from a layered compound $LiMO_2$, spinel compound $LiM_2O_4$, olivine compound $LiMPO_4$, silicate compound $Li_2MSiO_4$, Tavorite compound $LiMPO_4F$, borate compound $LiMBO_3$, or a combination thereof, wherein M is a transition metal or a mixture of multiple transition metals.

The inorganic material may be selected from: (a) bismuth selenide or bismuth telluride, (b) transition metal dichalcogenide or trichalcogenide, (c) sulfide, selenide, or telluride of niobium, zirconium, molybdenum, hafnium, tantalum, tungsten, titanium, cobalt, manganese, iron, nickel, or a transition metal; (d) boron nitride, or (e) a combination thereof.

The organic material or polymeric material may be selected from poly(anthraquinonyl sulfide) (PAQS), a lithium oxocarbon, 3,4,9,10-perylenetetracarboxylic dianhydride (PTCDA), poly(anthraquinonyl sulfide), pyrene-4,5,9,10-tetraone (PYT), polymer-bound PYT, quino(triazene), redox-active organic material, tetracyanoquinodimethane (TCNQ), tetracyanoethylene (TCNE), 2,3,6,7,10,11-hexamethoxytriphenylene (HMTP), poly(5-amino-1,4-dyhydroxy anthraquinone) (PADAQ), phosphazene disulfide polymer ($[(NPS_2)_3]n$), lithiated 1,4,5,8-naphthalenetetraol formaldehyde polymer, hexaazatrinaphtylene (HATN), hexaazatriphenylene hexacarbonitrile ($HAT(CN)_6$), 5-benzylidene hydantoin, isatine lithium salt, pyromellitic diimide lithium salt, tetrahydroxy-p-benzoquinone derivatives ($THQLi_4$), N,N'-diphenyl-2,3,5,6-tetraketopiperazine (PHP), N,N'-diallyl-2,3,5,6-tetraketopiperazine (AP), N,N'-dipropyl-2,3,5,6-tetraketopiperazine (PRP), a thioether polymer, a quinone compound, 1,4-benzoquinone, 5,7,12,14-pentacenetetrone (PT), 5-amino-2,3-dihydro-1,4-dyhydroxy anthraquinone (ADDAQ), 5-amino-1,4-dyhydroxy anthraquinone (ADAM), calixquinone, $Li_4C_6O_6$, $Li_2C_6O_6$, $Li_6C_6O_6$, or a combination thereof. These compounds are preferably mixed with a conducting material to improve their electrical conductivity, rigidity and strength so as to enable the peeling-off of graphene sheets from the graphitic material particles.

The thioether polymer in the above list may be selected from poly[methanetetryl-tetra(thiomethylene)] (PMTTM), poly(2,4-dithiopentanylene) (PDTP), a polymer containing poly(ethene-1,1,2,2-tetrathiol) (PETT) as a main-chain thioether polymers, a side-chain thioether polymer having a main-chain consisting of conjugating aromatic moieties, and having a thioether side chain as a pendant, poly(2-phenyl-1,3-dithiolane) (PPDT), poly(l,4-di(1,3-dithiolan-2-yl)benzene) (PDDTB), poly(tetrahydrobenzodithiophene) (PTHBDT), poly[1,2,4,5-tetrakis(propylthio)benzene] (PTKPTB, or poly[3,4(ethylenedithio)thiophene] (PEDTT).

In some embodiments, the organic material contains a phthalocyanine compound selected from copper phthalocyanine, zinc phthalocyanine, tin phthalocyanine, iron phthalocyanine, lead phthalocyanine, nickel phthalocyanine, vanadyl phthalocyanine, fluorochromium phthalocyanine, magnesium phthalocyanine, manganous phthalocyanine, dilithium phthalocyanine, aluminum phthalocyanine chloride, cadmium phthalocyanine, chlorogallium phthalocyanine, cobalt phthalocyanine, silver phthalocyanine, a metal-free phthalocyanine, a chemical derivative thereof, or a combination thereof. These compounds are preferably mixed with a conducting material to improve their electrical conductivity and rigidity so as to enable the peeling-off of graphene sheets from the graphitic material particles.

There is no limitation on the type of electrolyte that can be incorporated in the fast-chargeable battery: liquid electrolyte (e.g. organic solvent or ionic solid based electrolyte), polymer gel electrolyte, quasi-solid electrolyte, solid polymer electrolyte, inorganic solid electrolyte, composite electrolyte, etc. Batteries featuring a polymer or inorganic solid electrolyte may require a higher recharge temperature, having Tc typically from 50 to 90° C.

Figure 2:
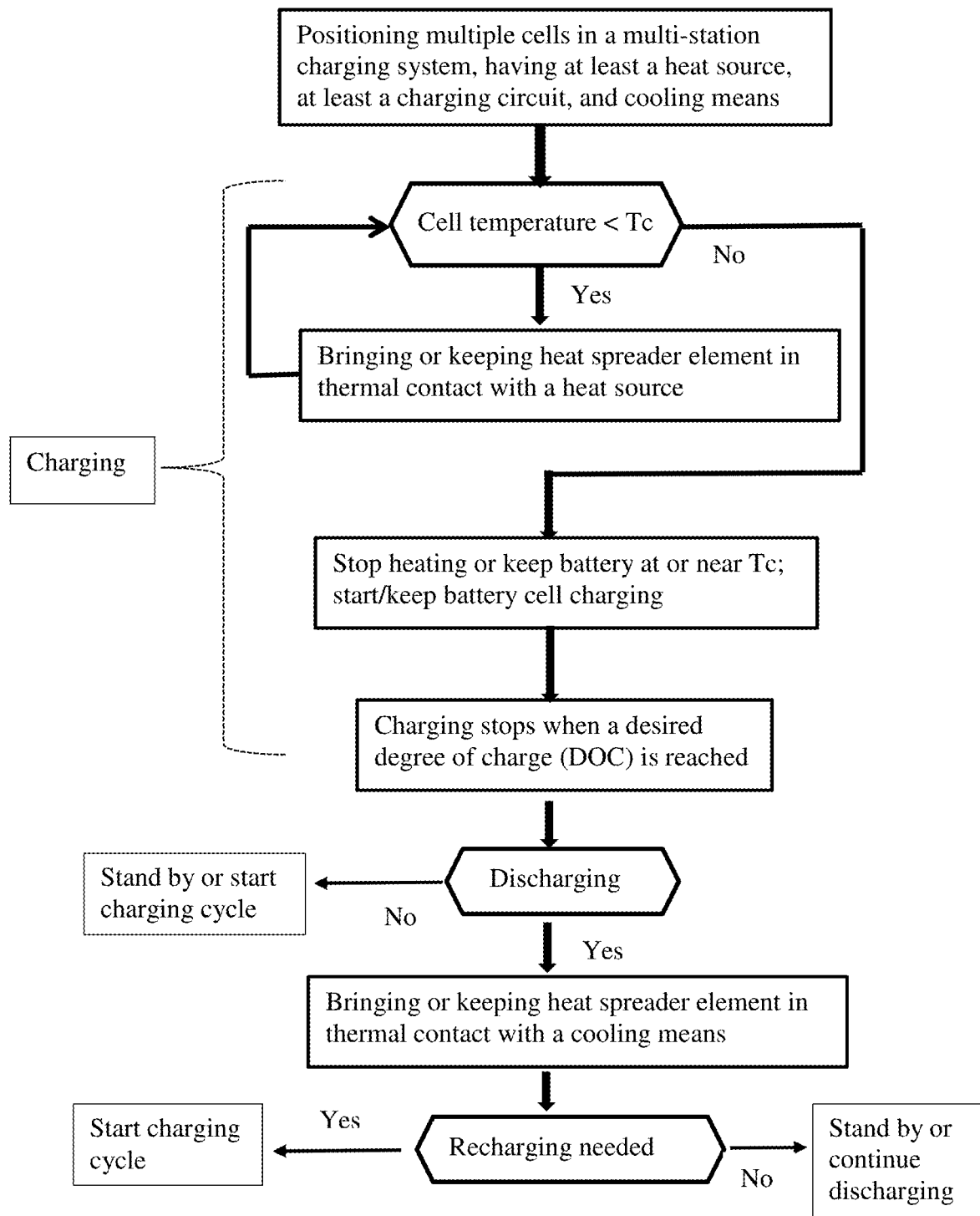
FIG. 2 A flow chart showing the method of operating the presently invented battery charging and cooling system according to an embodiment of present disclosure.

The present disclosure also provides a method of operating a battery charging/cooling system comprising multiple charging stations. As illustrated in FIG. 2 as an example, the method comprising: (a) positioning multiple rechargeable battery cells in the respective multiple charging stations; (b) operating at least a heat source of the battery charging system to provide heat that is transported through a heat spreader element (implemented fully or partially inside each of said battery cells) to heat up the battery cells to a desired temperature Tc; and (c) activating at least one charging circuit from the battery charging system to charge the battery cells at or near Tc until the battery cells reach a desired degree of charge (DOC).

In certain embodiments, preferably each of the battery cells comprises therein a heat spreader element having an end connected to an electrode terminal of the battery cell or having a tab protruded out of a protective housing of the battery cell and wherein step (b) comprises bringing the electrode terminal or the tab in thermal contact with an external heat source (e.g. if the battery is at a temperature lower than a desired charging temperature, Tc), allowing heat from the heat source to transfer into the battery cell for heating the battery to a desired temperature Tc.

In certain embodiments, the method further comprises a step of operating a temperature sensor for measuring an internal temperature of the battery. The step of operating a temperature sensor may comprise operating the heat-spreader element as a temperature sensor for measuring an internal temperature of the battery cell.

In the invented method, the heat-spreader element preferably comprises a high thermal conductivity material having a thermal conductivity no less than 10 W/mK (preferably no less than 20 W/mK, further preferably greater than 200 W/mK, more preferably greater than 400 W/mK, and most preferably greater than 800 W/mK), and wherein a time for heating the battery to temperature Tc is preferably no greater than 15 minutes (preferably less than 10 minutes, further preferably less than 5 minutes, most preferably less than 2 minutes).

In some preferred embodiments, the heat-spreader element comprises a material selected from graphene film, flexible graphite sheet, artificial graphite film, Ag, Ag, Cu, Al, brass, steel, Ti, Ni, Mg alloy sheet, silicon nitride, boron nitride, aluminum nitride, boron arsenide, a composite thereof, or a combination thereof. The graphene film preferably contains a graphene selected from pristine graphene, graphene oxide, reduced graphene oxide, graphene fluoride, graphene chloride, graphene bromide, graphene iodide, hydrogenated graphene, nitrogenated graphene, chemically functionalized graphene, or a combination thereof.

In some embodiments, the step of implementing a heat spreader element inside the battery cell comprises placing the heat-spreader element in physical or thermal contact with the anode or the cathode for providing heat thereto (e.g. for transporting heat through the anode or cathode electrode to heat up the battery cell prior to battery charging).

In some embodiments, the heat-spreader element has a tab protruded outside of the protective housing (e.g. as illustrated in FIG. 1(A)) and step (b) comprises controllably making the tab to be in thermal contact with the external heat source and disconnecting the tab from the external heat source when a battery temperature reaches the desired temperature Tc.

In certain embodiments, the heat-spreader element has a tab protruded outside of the protective housing and wherein (d) comprises controllably making the tab in thermal contact with the cooling means when the battery cell is discharged.

In some embodiments, the battery cell has an anode terminal and a cathode terminal for operating the battery cell and the heat-spreader element is in thermal contact with the anode terminal or the cathode terminal and wherein step (b) comprises bringing the anode terminal or the cathode terminal in physical or thermal contact with the external heat source for battery charging; or wherein step (d) comprises bringing the anode terminal or the cathode terminal in physical or thermal contact with the cooling means when the battery cell is discharged.

In some embodiments, the heat-spreader element is in thermal contact with the protective housing or a cap of the protective housing and step (b) comprises bringing the external heat source to thermally or physically contact the protective housing or the cap, supplying heat thereto for cell charging; or said (d) comprises bringing the cooling means to thermally or physically contact the protective housing or the cap, removing heat therefrom for battery discharging.

In certain desired embodiments, the battery cell has an anode terminal and a cathode terminal for operating the battery cell and the heat-spreader element is in thermal contact with the anode terminal or the cathode terminal (e.g. the cathode terminal protruded out as a battery cell cap of FIG. 1(B) and a graphene film is configured to be in thermal contact with this cap), wherein step (b) comprises bringing an electrode terminal (e.g. the cathode terminal) in physical or thermal contact with the external heat source. In some embodiments, the heat-spreader element is in thermal contact with the protective housing or a cap of the protective housing and step (b) comprises bringing the external heat source to thermally or physically contact the protective housing or the cap, supplying heat thereto.

Figure 4:
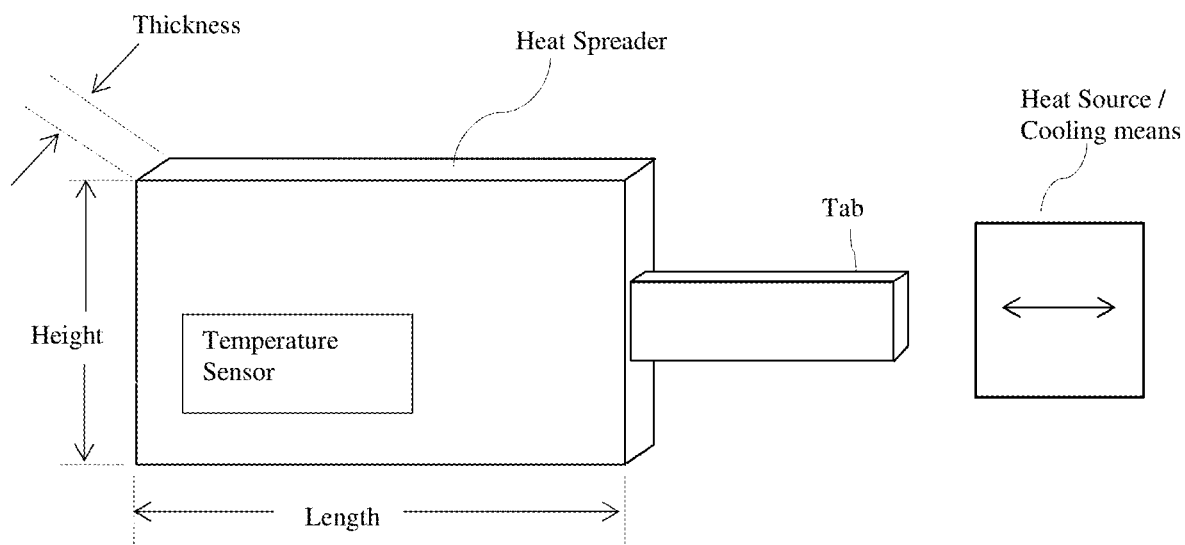
FIG. 4 Schematic of a heat spreader according to an embodiment of the present disclosure.

FIG. 4 shows a heat spreader in which the height, length, and thickness dimensions are defined. It should be understood that this drawing is not to scale, and is drawn in a manner to ease understanding, as the thickness may be much smaller (in a relative sense) than is shown. Also shown is an external heat source or means of cooling (or component of a heat source or means of cooling) that can be controllably moved into and out of thermal contact with the external tab of the heat source (as indicated by the double-headed arrow of FIG. 4). Lastly, a temperature sensor is shown which can be on the surface of the heat spreader, internal to the battery but spaced-apart from the heat spreader, or any other suitable location. It may be a resistive sensor, where the resistance is indicative of the temperature of the heat spreader or of the battery.

The following examples serve to provide the best modes of practice for the present disclosure and should not be construed as limiting the scope of the disclosure:

EXAMPLE 1

Preparation of Single-Layer Graphene Sheets and Their Heat-Spreader Films from Meso-Carbon Micro-Beads (MCMBs)

Meso-carbon microbeads (MCMBs) were supplied from China Steel Chemical Co., Kaohsiung, Taiwan. This material has a density of about 2.24 $g/cm^3$ with a median particle size of about 16 µm. MCMB (10 grams) were intercalated with an acid solution (sulfuric acid, nitric acid, and potassium permanganate at a ratio of 4:1:0.05) for 48-96 hours. Upon completion of the reaction, the mixture was poured into deionized water and filtered. The intercalated MCMBs were repeatedly washed in a 5% solution of HCl to remove most of the sulphate ions. The sample was then washed repeatedly with deionized water until the pH of the filtrate was no less than 4.5. The slurry was then subjected ultrasonication for 10-100 minutes to produce GO suspensions. TEM and atomic force microscopic studies indicate that most of the GO sheets were single-layer graphene when the oxidation treatment exceeded 72 hours, and 2- or 3-layer graphene when the oxidation time was from 48 to 72 hours.

The GO sheets contain oxygen proportion of approximately 35%-47% by weight for oxidation treatment times of 48-96 hours. GO sheets were suspended in water. The GO suspension was cast into thin graphene oxide films on a glass surface and, separately, was also slot die-coated onto a PET film substrate, dried, and peeled off from the PET substrate to form GO films. The GO films were separately heated from room temperature to 2,500° C. and then roll-pressed to obtain reduced graphene oxide (RGO) films for use as a heat spreader. The thermal conductivity of these films were found to be from 1,225 to 1,750 W/mK using Neize heat conductivity measuring device.

EXAMPLE 2

Preparation of Pristine Graphene Sheets (0% Oxygen) and Heat Spreader Films

Pristine graphene sheets were produced by using the direct ultrasonication or liquid-phase production process. In a typical procedure, five grams of graphite flakes, ground to approximately 20 µm or less in sizes, were dispersed in 1,000 mL of deionized water (containing 0.1% by weight of a dispersing agent, Zonyl® FSO from DuPont) to obtain a suspension. An ultrasonic energy level of 85 W (Branson 5450 Ultrasonicator) was used for exfoliation, separation, and size reduction of graphene sheets for a period of 15 minutes to 2 hours. The resulting graphene sheets are pristine graphene that have never been oxidized and are oxygen-free and relatively defect-free. There are no other non-carbon elements.

The pristine graphene sheets were immersed into a 10 mM acetone solution of BPO for 30 min and were then taken out drying naturally in air. The heat-initiated chemical reaction to functionalize graphene sheets was conducted at 80° C. in a high-pressure stainless steel container filled with pure nitrogen. Subsequently, the samples were rinsed thoroughly in acetone to remove BPO residues for subsequent Raman characterization. As the reaction time increased, the characteristic disorder-induced D band around 1330 $cm^{-1}$ emerged and gradually became the most prominent feature of the Raman spectra. The D-band is originated from the $A_{1g}$ mode breathing vibrations of six-membered $sp^2$ carbon rings, and becomes Raman active after neighboring $sp^2$ carbon atoms are converted to $sp^3$ hybridization. In addition, the double resonance 2D band around 2670 $cm^{-1}$ became significantly weakened, while the G band around 1580 $cm^{-1}$ was broadened due to the presence of a defect-induced D' shoulder peak at ~1620 $cm^{-1}$. These observations suggest that covalent C—C bonds were formed and thus a degree of structural disorder was generated by the transformation from $sp^2$ to $sp^3$ configuration due to reaction with BPO.

The functionalized graphene sheets were re-dispersed in water to produce a graphene dispersion. The dispersion was then made into graphene films using comma coating and subjected to heat treatments up to 2,500° C. The heat spreader films obtained from functionalized graphene sheets exhibit a thermal conductivity from 1,450 to 1,750 W/mK. On a separate basis, non-functionalized pristine graphene powder was directly compressed into graphene films (aggregates of graphene sheets) using pairs of steel rollers; no subsequent heat treatment was conducted. These graphene films exhibit a thermal conductivity typically from approximately 600 to about 1,000 W/mK.

EXAMPLE 3

Preparation of Graphene Fluoride Sheets and Heat Spreader Films

Several processes have been used by us to produce GF, but only one process is herein described as an example. In a typical procedure, highly exfoliated graphite (HEG) was prepared from intercalated compound $C_2F \cdot xClF_3$. HEG was further fluorinated by vapors of chlorine trifluoride to yield fluorinated highly exfoliated graphite (FHEG). Pre-cooled Teflon reactor was filled with 20-30 mL of liquid pre-cooled $ClF_3$, the reactor was closed and cooled to liquid nitrogen temperature. Then, no more than 1 g of HEG was put in a container with holes for $ClF_3$ gas to access and situated inside the reactor. In 7-10 days a gray-beige product with approximate formula $C_2F$ was formed.

Subsequently, a small amount of FHEG (approximately 0.5 mg) was mixed with 20-30 mL of an organic solvent (methanol, ethanol, 1-propanol, 2-propanol, 1-butanol, tert-butanol, isoamyl alcohol) and subjected to an ultrasound treatment (280 W) for 30 min, leading to the formation of homogeneous yellowish dispersions. Five minutes of sonication was enough to obtain a relatively homogenous dispersion, but a longer sonication time ensured better stability. Upon extrusion to form wet films on a glass surface with the solvent removed, the dispersion became brownish films formed on the glass surface. The dried films, upon drying and roll-pressing, became heat spreader films having a reasonably good thermal conductor (thermal conductivity from 250 to 750 W/mK), yet an electrical insulator. The unique combination of electrical insulation and thermal conduction characteristics is of particular interest for battery heating configurations wherein there is no concern of any potential negative effect cause by an electrical conductor.

EXAMPLE 4

Preparation of Nitrogenated Graphene Sheets and Graphene Films for Use as a Heat Spreader Element Graphene oxide (GO), synthesized in Example 1, was finely ground with different proportions of urea and the pelletized mixture heated in a microwave reactor (900 W) for 30 s. The product was washed several times with deionized water and vacuum dried. In this method graphene oxide gets simultaneously reduced and doped with nitrogen. The products obtained with graphene/urea mass ratios of 1/0.5, 1/1 and 1/2 have the nitrogen contents of 14.7, 18.2 and 17.5 wt. %, respectively, as found by elemental analysis. These nitrogenated graphene sheets, without prior chemical functionalization, remain dispersible in water. The resulting suspensions were then coated and made into wet films and then dried. The dried films were roll-pressed to obtain graphene films, having a thermal conductivity from 350 to 820 W/mK. These films are also electrical insulators.

EXAMPLE 5

Fast-Chargeable Lithium-Ion, Sodium-Ion, Lithium Metal, Lithium-Sulfur Batteries Enabled by Heat-Spreader Heating For most of the anode and cathode active materials investigated, we prepared lithium-ion cells or lithium metal cells using the conventional slurry coating method. A typical anode composition includes 85 wt. % active material (e.g., graphene-encapsulated Si, SiO, $SnO_2$, and $Co_3O_4$ particles available from Angstron Energy Co., Dayton, Ohio), 7 wt. % acetylene black (Super-P), and 8 wt. % polyvinylidene fluoride binder (PVDF, 5 wt. % solid content) dissolved in N-methyl-2-pyrrolidinoe (NMP). After coating the slurries on Cu foil, the electrodes were dried at 120° C. in vacuum for 2 h to remove the solvent. It may be noted that Cu foil recited here is used as a current collector that allows electric current to go in and out of the anode electrode. A separate sheet of Cu foil may be added as a heat spreader element for heat-transporting purpose, not for conducting electrons.

Cathode layers (e.g. LFP, NCM, $LiCoO_2$, etc.) are made in a similar manner (using Al foil as the cathode current collector) using the conventional slurry coating and drying procedures.

An anode layer, separator layer (e.g. Celgard 2400 membrane), a cathode layer, and a heat spreader layer (graphene film, flexible graphite sheet, Cu foil, Ni foil, etc.) are then laminated together and housed in a plastic-Al envelop (a protective housing or casing). An anode tab or terminal, a cathode tab, and a heat spreader tab are allowed to get protruded out of the protective housing, as illustrated in FIG. 1(A).

The cell is then injected with 1 M $LiPF_6$ electrolyte solution dissolved in a mixture of ethylene carbonate (EC) and diethyl carbonate (DEC) (EC-DEC, 1:1 v/v). In some cells, ionic liquids were used as the liquid electrolyte. The cell assemblies were made in an argon-filled glove-box.

The cyclic voltammetry (CV) measurements were carried out using an Arbin electrochemical workstation at a typical scanning rate of 1-100 mV/s. In addition, the electrochemical performances of various cells were also evaluated by galvanostatic charge/discharge cycling at a current density of from 50 mA/g to 10 A/g. For long-term cycling tests, multi-channel battery testers manufactured by LAND were used. An environment-controlled oven was used to perform battery testing at different temperatures when desired.

EXAMPLE 6

Some Examples of Cathode Active Materials for a Lithium Metal Battery

Cathode active materials in lithium-ion or lithium metal secondary batteries are known to have a relatively low thermal conductivity. It is thus advantageous to encapsulate cathode active material particles with graphene which, if coupled with a high thermal conductivity heat spreader (e.g. graphene film or artificial graphite film from graphitized PI), enables faster heating of the battery to a desired temperature for fast charging.

For instance, lithium iron phosphate (LFP) powder, un-coated or carbon-coated, is commercially available from several sources. The carbon-coated LFP powder and un-coated LFP powder samples were separately mixed with natural graphite particles in ball mill pots of a high-intensity ball mill apparatus. The apparatus was operated for 0.5 to 4 hours for each LFP material to produce graphene-encapsulated LFP particles.

$V_2O_5$ powder is commercially available. A mixture of $V_2O_5$ powder and natural graphite (10/1 weight ratio) was sealed in each of 4 ball milling pots symmetrically positioned in a high-intensity ball mill. The mill was operated for 1 hour to produce particulates of graphene-encapsulated $V_2O_5$ particles, which were implemented as the cathode active material in a lithium metal battery. Coated primary particles, 2-7.5% by weight pristine graphene or amine-functionalized graphene sheets, and a small amount of surfactant (Triton-100) were added into deionized water to make slurries. The slurries were then ultrasonic sprayed onto glass substrate surface to form particulates.

In a set of experiments, a mixture of $LiCoO_2$ powder and natural graphite (100/1-10/1 weight ratio) was sealed in each of 4 ball milling pots symmetrically positioned in a high-intensity ball mill. The mill was operated for 0.5-4 hours to produce particulates of graphene-encapsulated $LiCoO_2$ particles.

EXAMPLE 7

Organic Cathode Active Material ($Li_2C_6O_6$) of a Fast-Chargeable Lithium Metal Battery The experiments associated with this example were conducted to determine if organic materials, such as $Li_2C_6O_6$, can be encapsulated in graphene sheets using the presently invented direct transfer method. The result is that organic active materials alone are typically incapable of peeling off graphene sheets from graphite particles. However, if a second active material (i.e. rigid particles of an inorganic material or a metal oxide/phosphate/sulfide) is implemented along with an organic active material in a ball milling pot, then the organic material particles and inorganic material particles can be separately or concurrently encapsulated to form graphene-encapsulated organic particles, graphene-encapsulated inorganic particles, and graphene-encapsulated mixture of organic and inorganic particles. This is interesting and surprising.

In order to synthesize dilithium rhodizonate ($Li_2C_6O_6$), the rhodizonic acid dihydrate (species 1 in the following scheme) was used as a precursor. A basic lithium salt, $Li_2CO_3$, can be used in aqueous media to neutralize both enediolic acid functions. Strictly stoichiometric quantities of both reactants, rhodizonic acid and lithium carbonate, were allowed to react for 10 hours to achieve a yield of 90%. Dilithium rhodizonate (species 2) was readily soluble even in a small amount of water, implying that water molecules are present in species 2. Water was removed in a vacuum at 180° C. for 3 hours to obtain the anhydrous version (species 3).

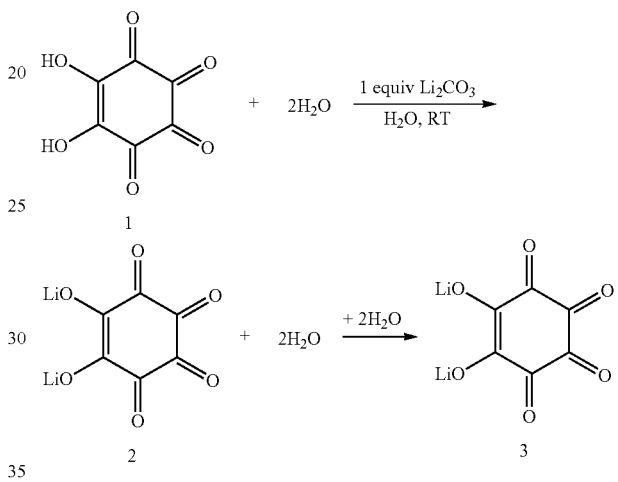

A mixture of an organic cathode active material ($Li_2C_6O_6$) and an inorganic cathode active material ($V_2O_5$ and $MoS_2$, separately) was ball-milled for 0.5-2.0 hours to obtain a mixture of graphene-encapsulated particles.

Coated primary particles, 2-7.5% by weight pristine graphene or amine-functionalized graphene sheets, and a small amount of surfactant (Triton-100) were added into deionized water to make slurries. The slurries were then ultrasonic sprayed onto glass substrate surface to form particulates. It may be noted that the two Li atoms in the formula $Li_2C_6O_6$ are part of the fixed structure and they do not participate in reversible lithium ion storing and releasing. This implies that lithium ions must come from the anode side. Hence, there must be a lithium source (e.g. lithium metal or lithium metal alloy) at the anode. In one battery cell herein tested, the anode current collector (Cu foil) is deposited with a layer of lithium (via sputtering). The resulting cell is a lithium metal cell. Flexible graphite sheets, Cu foil, and graphene fluoride films were used as a heat spreader element material to enable fast chargeability.

Example 8: Graphene-encapsulated $Na_3V_2(PO_4)_3/C$ and $Na_3V_2(PO_4)_3$ cathodes for sodium metal batteries The $Na_3V_2(PO_4)_3/C$ sample was synthesized by a solid state reaction according to the following procedure: a stoichiometric mixture of $NaH_2PO_4 \cdot 2H_2O$ (99.9%, Alpha) and $V_2O_3$ (99.9%, Alpha) powders was put in an agate jar as a precursor and then the precursor was ball-milled in a planetary ball mill at 400 rpm in a stainless steel vessel for 8 h. During ball milling, for the carbon coated sample, sugar (99.9%, Alpha) was also added as the carbon precursor and the reductive agent, which prevents the oxidation of $V^{3+}$.

After ball milling, the mixture was heated at 900° C. for 24 h in Ar atmosphere. Separately, the $Na_3V_2(PO_4)_3$ powder was prepared in a similar manner, but without sugar. Samples of both powders were then subjected to ball milling in the presence of natural graphite particles to prepare graphene-encapsulated $Na_3V_2(PO_4)_3$ particles and graphene-encapsulated carbon-coated $Na_3V_2(PO_4)_3$ particles. Coated primary particles, 5-13.5% by weight pristine graphene or amine-functionalized graphene sheets, and a small amount of surfactant (Triton-100) were added into deionized water to make slurries. The slurries were then spray-dried to form particulates.

The particulates of cathode active materials were used in several Na metal cells containing 1 M of $NaPF_6$ salt in PC+DOL as the electrolyte. It was discovered that graphene encapsulation significantly improved the cycle stability of all Na metal cells studied. In terms of cycle life, the following sequence was observed: graphene-encapsulated $Na_3V_2(PO_4)_3$/C>graphene-encapsulated $Na_3V_2(PO_4)_3$>$Na_3V_2(PO_4)_3$/C>$Na_3V_2(PO_4)_3$. The incorporation of graphene films or PI-derived graphitic films, used as a heat spreader, enables the sodium metal cells to be recharged in less than 10 minutes at 60° C.

EXAMPLE 9

Preparation of Graphene-Encapsulated $MoS_2$ Particles as a Cathode Active Material of a Na metal battery (fast chargeability enabled by a heat-spreader element)

A wide variety of inorganic materials were investigated in this example. For instance, an ultra-thin $MoS_2$ material was synthesized by a one-step solvothermal reaction of $(NH_4)_2MoS_4$ and hydrazine in N, N-dimethylformamide (DMF) at 200° C. In a typical procedure, 22 mg of $(NH_4)_2MoS_4$ was added to 10 ml of DMF. The mixture was sonicated at room temperature for approximately 10 min until a clear and homogeneous solution was obtained. After that, 0.1 ml of $N_2H_4.H_2O$ was added. The reaction solution was further sonicated for 30 min before being transferred to a 40 mL Teflon-lined autoclave. The system was heated in an oven at 200° C. for 10 h. Product was collected by centrifugation at 8000 rpm for 5 min, washed with DI water and recollected by centrifugation. The washing step was repeated for 5 times to ensure that most DMF was removed.

Subsequently, $MoS_2$ particles were dried and subjected to graphene encapsulation by high-intensity ball milling in the presence of natural graphite particles. An Al foil and a flexible graphite sheet were separately used as a heat spreader element in constructing a fast-chargeable Na metal battery.

EXAMPLE 10

Preparation of Graphene-Encapsulated $MnO_2$ and $NaMnO_2$ Cathode Active Material for Fast-Chargeable Na Metal Cells and Zn Metal Cells Featuring a Heat Spreader Element For the preparation of the $MnO_2$ powder, a 0.1 mol/L $KMnO_4$ aqueous solution was prepared by dissolving potassium permanganate in deionized water. Meanwhile, 13.32 g surfactant of high purity sodium bis(2-ethylhexyl) sulfosuccinate was added in 300mL iso-octane (oil) and stirred well to get an optically transparent solution. Then, 32.4mL of 0.1 mol/L $KMnO_4$ solution was added into the solution, which was ultrasonicated for 30 min to prepare a dark brown precipitate. The product was separated, washed several times with distilled water and ethanol, and dried at 80° C. for 12 h. Some amount of the $MnO_2$ powder was then subjected to the direct transfer treatment to obtain graphene-encapsulated $MnO_2$ particles.

Additionally, $NaMnO_2$ particles were synthesized by ball-milling a mixture of $Na_2CO_3$ and $MnO_2$ (at a molar ratio of 1:2) for 12 h followed by heating at 870° C. for 10 h. The resulting $NaMnO_2$ particles were then subjected to ball-milling in the presence of MCMB particles to prepare graphene encapsulated $NaMnO_2$ particles.

The $MnO_2$ particles, with or without graphene encapsulation, are also incorporated in alkaline $Zn/MnO_2$ cells. Graphene encapsulation was found to dramatically increase the cycle life of this type of cell. The Zn-graphene/$MnO_2$ battery is composed of a graphene/$MnO_2$-based cathode (with an optional cathode current collector and an optional conductive filler), a Zn metal or alloy-based anode (with an optional anode current collector), and an aqueous electrolyte (e.g. a mixture of a mild $ZnSO_4$ or $Zn(NO_3)_2$ with $MnSO_4$ in water). Graphene films (RGO) were used as a heat spreader element in the battery cell to enable fast chargeability.

The invention claimed is:

1. A battery charging system comprising (a) at least one charging circuit to charge at least one rechargeable battery cell; (b) a heat source to provide heat that is transported through a heat spreader element, implemented fully or partially inside said at least one battery cell, to heat up said battery cell to a desired temperature Tc before or during charging of said battery cell; and (c) cooling means in thermal contact with the heat spreader element configured to enable transporting internal heat of the battery cell through the heat spreader element to the cooling means when the battery cell is discharged, wherein the cooling means is not in thermal contact with the heat spreader element when the battery cell is heated by the heat source; and
   wherein the heat-spreader element does not receive an electrical current from the charging circuit to generate heat inside the battery cell for internal resistance heating of the battery cell.

2. The battery charging system of claim 1, wherein said rechargeable battery cell comprises an anode, a cathode, an electrolyte disposed between the anode and the cathode, and a protective housing that at least partially encloses the anode, the cathode and the electrolyte, wherein said heat-spreader element is disposed partially or entirely inside the protective housing and configured to alternate between receiving heat from said heat source at a desired heating temperature $T_h$ to heat up the battery cell to the desired temperature Tc for battery cell charging and transferring heat from the battery cell to the cooling means when the battery cell is discharged or provides electric power to an external device or load.

3. The battery charging system of claim 1, wherein the heat-spreader element does not receive an electrical current from said charging circuit to generate heat inside the battery cell for resistance heating of the battery cell.

4. The battery charging system of claim 1, wherein said at least a battery cell comprises at least a temperature sensor for measuring an internal temperature of the battery and sending a signal of said internal temperature to said charging circuit.

5. The battery charging system of claim 1, wherein the heat-spreader element acts as a temperature sensor for measuring an internal temperature of the battery.

6. The battery charging system of claim 1, wherein said heat-spreader element comprises a high thermal conductivity material having a thermal conductivity no less than 10 W/mK.

7. The battery charging system of claim 1, wherein said heat-spreader element comprises a material selected from a graphene film, flexible graphite sheet, artificial graphite film, Ag, Ag, Cu, Al, brass, steel, Ti, Ni, Mg alloy sheet, silicon nitride, boron nitride, aluminum nitride, boron arsenide, a composite thereof, or a combination thereof.

8. The battery charging system of claim 7, wherein said graphene film contains a graphene selected from pristine graphene, graphene oxide, reduced graphene oxide, graphene fluoride, graphene chloride, graphene bromide, graphene iodide, hydrogenated graphene, nitrogenated graphene, chemically functionalized graphene, or a combination thereof.

9. The battery charging system of claim 1, wherein the heat source is heated by using laser heating, resistance heating, dielectric heating, thermal-electric heating, microwave heating, radio frequency heating, hot fluid heating, or a combination thereof.

10. The battery charging system of claim 1, wherein the cooling means is selected from a heat sink, a heat pipe, a vapor chamber, a stream of flowing fluid, a thermoelectric device, a heat exchanger, a radiator, or a combination thereof.

11. The battery charging system of claim 1, wherein the heat-spreader element is in a heat-spreading relation to an anode or a cathode of a battery cell and provides heat thereto before or during charging of the battery cell or receives heat therefrom when the battery cell is discharged to power an external device.

12. The battery charging system of claim 1, wherein the heat source or the cooling means has a clipping means or connector means to reversibly grip or connect with a tab of said heat spreader element.

13. The battery charging system of claim 1, wherein the heat-spreader element has a tab protruded outside of the protective housing, wherein said tab is configured to controllably make thermal contact with the external heat source and get disconnected with the external heat source when a battery temperature reaches the desired temperature Tc.

14. The battery charging system of claim 1, wherein the battery has an anode terminal and a cathode terminal for operating the battery and the heat-spreader element is in thermal contact with the anode terminal or the cathode terminal wherein the anode terminal or the cathode terminal is configured to receive heat from the external heat source.

15. The battery charging system of claim 1, wherein the heat-spreader element is in thermal contact with the protective housing or a cap of the protective housing.

16. The battery charging system of claim 1, wherein the battery is a lithium-ion battery, lithium metal secondary battery, lithium-sulfur battery, lithium-air battery, lithium-selenium battery, sodium-ion battery, sodium metal secondary battery, sodium-sulfur battery, sodium-air battery, magnesium-ion battery, magnesium metal battery, aluminum-ion battery, aluminum metal secondary battery, zinc-ion battery, zinc metal battery, zinc-air battery, nickel metal hydride battery, lead acid battery, lead acid-carbon battery, lead acid-based ultra-battery, lithium-ion capacitor, or supercapacitor.

17. A method of operating a battery charging system comprising multiple charging stations, said method comprising: (a) positioning multiple rechargeable battery cells respectively in said multiple charging stations; (b) operating at least a heat source in said battery charging system to provide heat that is transported through a heat spreader element, implemented fully or partially inside each of said battery cells, to heat up said battery cells to a desired temperature Tc; (c) activating at least one charging circuit in said battery charging system to charge said battery cells at or near Tc until said battery cells reach a desired degree of charge; and (d) stop battery cell charging and bringing the heat spreader element to make thermal contact with a cooling means; and wherein the heat-spreader element does not receive an electrical current from the charging circuit to generate heat inside the battery cell for internal resistance heating of the battery cell.

18. The method of claim 17, wherein each of said battery cells comprises therein a heat spreader element having an end connected to an electrode terminal of the battery cell or having a tab protruded out of a protective housing of the battery cell and wherein said step (b) comprises bringing the electrode terminal or the tab in thermal contact with said external heat source, allowing heat from the heat source to transfer into the battery cell for heating the battery to a desired temperature Tc.

19. The method of claim 17, further comprising a step of operating a temperature sensor for measuring an internal temperature of the battery cells.

20. The method of claim 17, wherein said heat-spreader element comprises a high thermal conductivity material having a thermal conductivity no less than 10 W/mK and wherein a time for heating the battery cells to temperature Tc is no greater than 15 minutes.

21. The method of claim 17, wherein said heat-spreader element comprises a material selected from graphene film, flexible graphite sheet, artificial graphite film, Ag, Ag, Cu, Al, brass, steel, Ti, Ni, Mg alloy sheet, silicon nitride, boron nitride, aluminum nitride, boron arsenide, a composite thereof, or a combination thereof.

22. The method of claim 21, wherein said graphene film contains a graphene selected from pristine graphene, graphene oxide, reduced graphene oxide, graphene fluoride, graphene chloride, graphene bromide, graphene iodide, hydrogenated graphene, nitrogenated graphene, chemically functionalized graphene, or a combination thereof.

23. The method of claim 17, wherein the step of implementing a heat spreader element inside the battery cell comprises placing the heat-spreader element in physical or thermal contact with the anode or the cathode for providing heat thereto.

24. The method of claim 17, wherein the heat-spreader element has a tab protruded outside of the protective housing and wherein said step (b) comprises controllably making the tab in thermal contact with the external heat source and disconnecting the tab from the external heat source when a battery cell temperature reaches the desired temperature Tc.

25. The method of claim 17, wherein the heat-spreader element has a tab protruded outside of the protective housing and wherein said step (d) comprises controllably making the tab in thermal contact with the cooling means when the battery cell is discharged.

26. The method of claim 17, wherein the battery cell has an anode terminal and a cathode terminal for operating the battery cell and the heat-spreader element is in thermal contact with the anode terminal or the cathode terminal and wherein step (b) comprises bringing the anode terminal or the cathode terminal in physical or thermal contact with the external heat source for battery charging; or wherein step (d) comprises bringing the anode terminal or the cathode terminal in physical or thermal contact with the cooling means when the battery cell is discharged.

27. The method of claim 17, wherein the heat-spreader element is in thermal contact with the protective housing or a cap of the protective housing and said step (b) comprises bringing the external heat source to thermally or physically contact the protective housing or the cap, supplying heat thereto for cell charging; or said step (d) comprises bringing the cooling means to thermally or physically contact the protective housing or the cap, removing heat therefrom for battery discharging.

\* \* \* \* \*